United States Patent
Chang

(10) Patent No.: US 11,155,411 B2
(45) Date of Patent: Oct. 26, 2021

(54) STORAGE AND TRANSPORTATION SYSTEM FOR AUTOMATED WAREHOUSE AND POSITIONING CONTROL METHOD THEREOF

(71) Applicant: Chih Lu Chang, New Taipei (TW)

(72) Inventor: Chih Lu Chang, New Taipei (TW)

(*) Notice: Subject to any disclaimer, the term of this patent is extended or adjusted under 35 U.S.C. 154(b) by 233 days.

(21) Appl. No.: 16/518,525

(22) Filed: Jul. 22, 2019

(65) Prior Publication Data
US 2020/0048003 A1 Feb. 13, 2020

(30) Foreign Application Priority Data
Aug. 10, 2018 (CN) .......................... 201821287429.3

(51) Int. Cl.
*B65G 1/137* (2006.01)
(52) U.S. Cl.
CPC .................................. *B65G 1/1375* (2013.01)
(58) Field of Classification Search
CPC ............................................... B65G 1/1375
See application file for complete search history.

(56) References Cited

U.S. PATENT DOCUMENTS

| 5,041,907 A * | 8/1991 | Sager | .................... | B25J 9/1697 |
| | | | | 348/91 |
| 2009/0265031 A1* | 10/2009 | Tachibana | ............ | B65G 1/0407 |
| | | | | 700/214 |

* cited by examiner

*Primary Examiner* — Kyle O Logan
(74) *Attorney, Agent, or Firm* — Wang Law Firm, Inc.

(57) ABSTRACT

A storage and transportation system for automated warehouse and positioning control method thereof are disclosed. The system includes: a plurality of three-dimensional storage cabinets, a plurality of guiding rail assemblies, a plurality of automatic conveying modules, at least an automatic positioning module, at least a reading module, at least an automatic gripping module, and a central control processing module. The positioning control method includes: a conveying step, a mechanical positioning step, a sensing reading step, an optical positioning step, a computation processing step, a transmission step, and an operation step. Through the collaboration among the modules and the steps, the invention performs optical and mechanical positioning during accessing material, thereby enabling reading the information of material crate in delivery processes and realizing synchronous monitoring and automatic access of the material tray of material crates in the automated warehouse system with high precision, and achieving high access efficiency and accurate identification.

10 Claims, 12 Drawing Sheets

STORAGE AND TRANSPORTATION SYSTEM FOR AUTOMATED WAREHOUSE AND POSITIONING CONTROL METHOD THEREOF

CROSS-REFERENCE TO RELATED APPLICATION

This application claims the priority of Chinese patent application No. 201821287429.3, filed on Aug. 10, 2018, which is incorporated herewith by reference.

BACKGROUND OF THE INVENTION

1. Field of the Invention

The present invention relates generally to a structure of an automated warehouse system, and more particularly, to provide a storage and transportation system for automated warehouse and positioning control method thereof.

2. The Prior Arts

As the products are different in different industries and enterprises, the frequency of use of material warehouses is not the same among the companies; however, for enterprises with numerous material types and large material storage capacity, material storage management is directly related to the management of the enterprise's production and plays a decisive role.

However, take Surface Mount Technology (SMT) as an example, SMT is a fundamental industry in the field of electronics manufacturing; therefore, the warehouse is known to be an important part of SMT's manufacturing process, including the steps of feeding material, discharging material, returning material, and refilling material.

However, most of the existing storage delivery systems use paper bills of materials and manual identification and searching, which are low in efficiency, high in error rate and poor in real-time updateability, and thus place a high demand on the operator skills. As a result, skilled personnel must undergo training for a long time to effectively carry out the feeding and discharging processes. Furthermore, in order to be able to sort and store materials efficiently and accurately, the storage locations of different types of materials are mostly fixed settings, which raises the requirements on the skills of the operators to perform the process such as feeding and discharging.

Furthermore, due to the characteristics of large-amount and multi-variety in the manufacturing industry of the electronic products, more materials are used; if the manual management and delivery of material approach is used, there will be difficulty in finding the materials and the process will be time consuming. Therefore, it is necessary to consider the automation of material storage and transportation to shorten the time of locating and acquiring the materials to improve the logistics speed and production efficiency.

Therefore, the inventor devised the present invention to address the above-mentioned deficiency in current industry.

SUMMARY OF THE INVENTION

A primary objective of the present invention is to provide a storage and transportation system for automated warehouse, which is capable of optical positioning and mechanical positioning during the operation of the access material, thereby enabling reading the information of the material crate in delivery processes. At the same time, the present invention realizes the interference-free access flow in multi-station processes, and realizes the synchronous monitoring and automatic access of the material tray of the material crates in the automated warehouse system in a high-precision manner, so as to achieve high access efficiency and accurate identification.

For achieving the foregoing objectives, the present invention provides a storage and transportation system for automated warehouse, comprising: a plurality of three-dimensional storage cabinets arranged at intervals, and having a plurality of layers of accommodation spaces, with the plurality of material crates disposed in the plurality of accommodation spaces, and at least a moving space between two three-dimensional storage cabinets; a plurality of guiding rail assemblies, disposed on a ground of the moving space, and adjacent to a circumferential side of the three-dimensional storage cabinet, the guiding rail assemblies being interconnected; at least a vertical lifting and material-accessing device, movably in a sliding manner disposed on the guiding rail assemblies; a plurality of automatic conveying modules, disposed adjacent to a side of the three-dimensional storage cabinets and maintaining a distance from the three-dimensional storage cabinets, the automatic conveying module being configured to transport at least a material crate, whose outer side being provided with at least a sensing tag and at least a sensing and positioning structure; at least an automatic positioning module, disposed on the automatic conveying module, and having at least two mechanical positioning members and a sensing processing unit, the sensing processing unit being coupled to the mechanical positioning members, and when the automatic positioning module being used during the automatic conveying module transporting the material crate, the mechanical positioning members temporarily position the material crate on the automatic conveying module, and the sensing processing unit transmitting at least a fixed-point signal; at least a reading module, having a plurality of optical readers and a plurality of information readers, and disposed at locations selected from at least one of the group consisting of the three-dimensional storage cabinets, the vertical lifting and material-accessing device, the guiding rail assemblies and the automatic conveying modules, and at least one optical reader and at least one information reader being respectively disposed adjacent to the automatic positioning module, and being configured to optically read the positioning of material crate and scan to read the information of the material crate, and transmitting at least an optical positioning signal and at least a material information; at least an automatic gripping module, located on one side of at least an automatic conveying module, and two automatic conveying modules being disposed respectively on two sides of the automatic gripping module; and a central control processing module, coupled to the vertical lifting and material-accessing device, the plurality of automatic conveying modules, the automatic gripping module, the reading module and the automatic positioning module, for receiving and processing the fixed-point signal, the optical positioning signal and the material information, and then controlling the vertical lifting and material-accessing device, the plurality of automatic conveying modules, the automatic gripping module, the reading module and the automatic positioning module to act.

Based on the aforementioned storage and transportation system for automated warehouse, the present invention further provides a positioning control method, comprising: a conveying step: the plurality of automatic conveying modules conveying a plurality of material crates; a mechanical positioning step: in conveying the material crates, the sensing processing unit causing one of the mechanical positioning members to push one side of the material crate, and another mechanical positioning member to push the other side of the material crate so that the material crate being located in an optical positioning space, and then the sensing processing unit transmitting at least a fixed-point signal; a sensing reading step: the plurality of information readers reading the sensing tag and generating at least one material information, and the sensing processing unit transmitting the material information to the central control processing module; an optical positioning step: the plurality of optical readers reading the first identification reflective portion and the second identification reflective portion to obtain at least one optical positioning signal, and the sensing processing unit transmitting the optical positioning signal to the central control processing module; a computation processing step: the central control processing module receiving and processing the fixed-point signal, the optical positioning signal and the material information to obtain a plurality of material-retrieving information and a plurality of feeding information, and converting the plurality of material-retrieving information and the plurality of feeding information into a plurality of execution process information; a transmission step: the central control processing module transmitting the execution process information to the vertical lifting and material-accessing device, the plurality of automatic conveying modules, and the automatic gripping module and the reading module to control the vertical lifting and material-accessing device, the plurality of automatic conveying modules, the automatic gripping module and the reading module to act; and an operation step: the vertical lifting and material-accessing device, the plurality of automatic conveying modules, and the automatic gripping module performing at least a material-retrieving operation and at least a material-depositing operation according to the execution process information.

The present invention provides a storage and transportation system for automated warehouse and a positioning control method thereof, wherein the automatic positioning module is used to position the material crate in a mechanical positioning manner, and the sensing tag and the sensing and positioning structure of the material crate are disposed to allow the reading module to position the material crate in an optical reading manner and to scan to read the information of the material crate. More specifically, the present invention is capable of performing optical positioning and mechanical positioning during the process of accessing the material. In collaboration with the use of the vertical lifting and material-accessing device, the plurality of automatic conveying modules, the automatic gripping module, the reading module, the automatic positioning module and the central control processing module, as well as the use of the aforementioned positioning control method. The present invention can thereby realize reading material crate information in the transportation process, and at the same time realize the interference-free access flow in a multi-station process, so as to achieve high precision in the synchronous monitoring and automatic access function of the material trays in the existing automatic storage, as well as high access efficiency and accurate identification.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
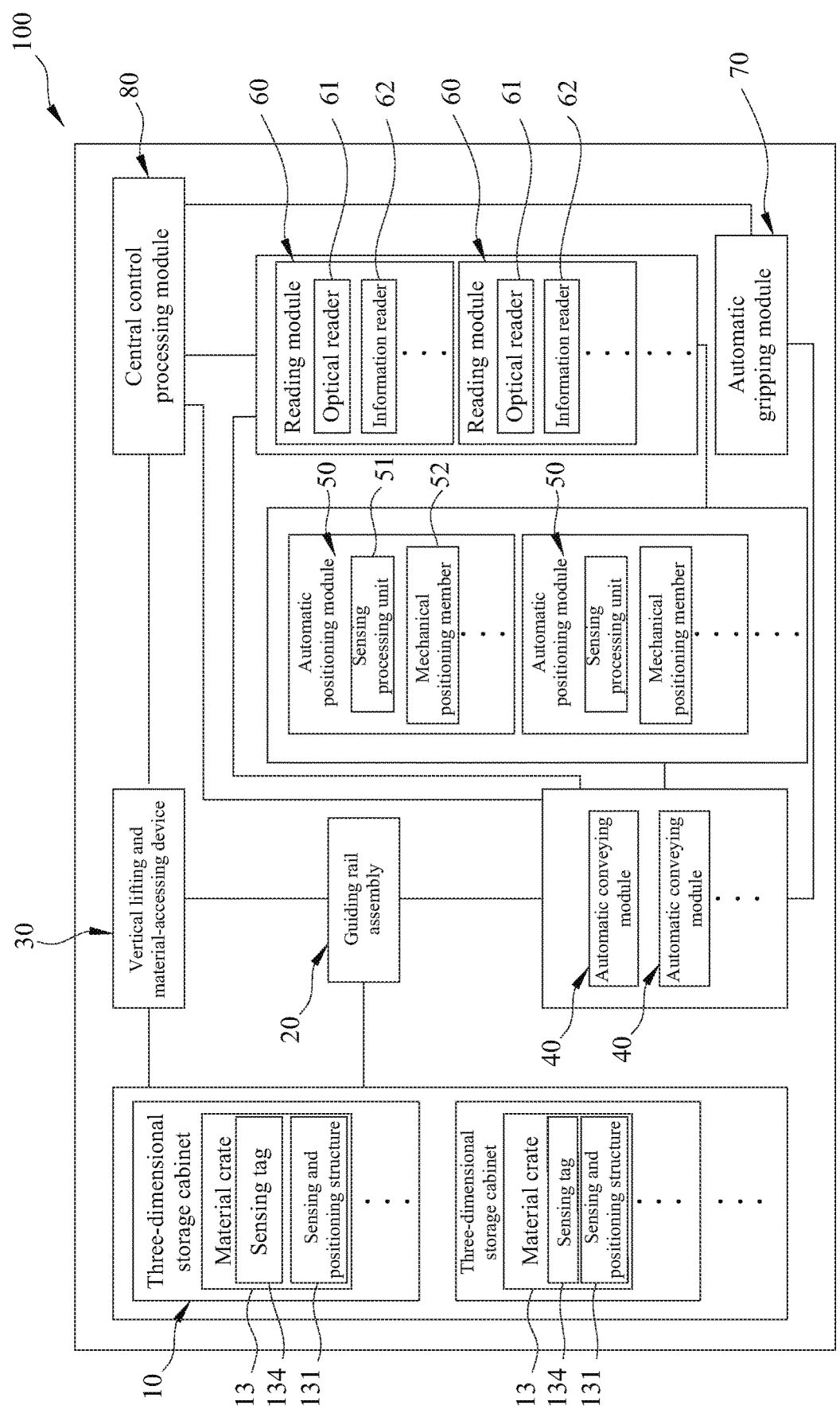
FIG. 1 is a block diagram of a system in accordance with a preferred embodiment of the present invention.
Figure 2:
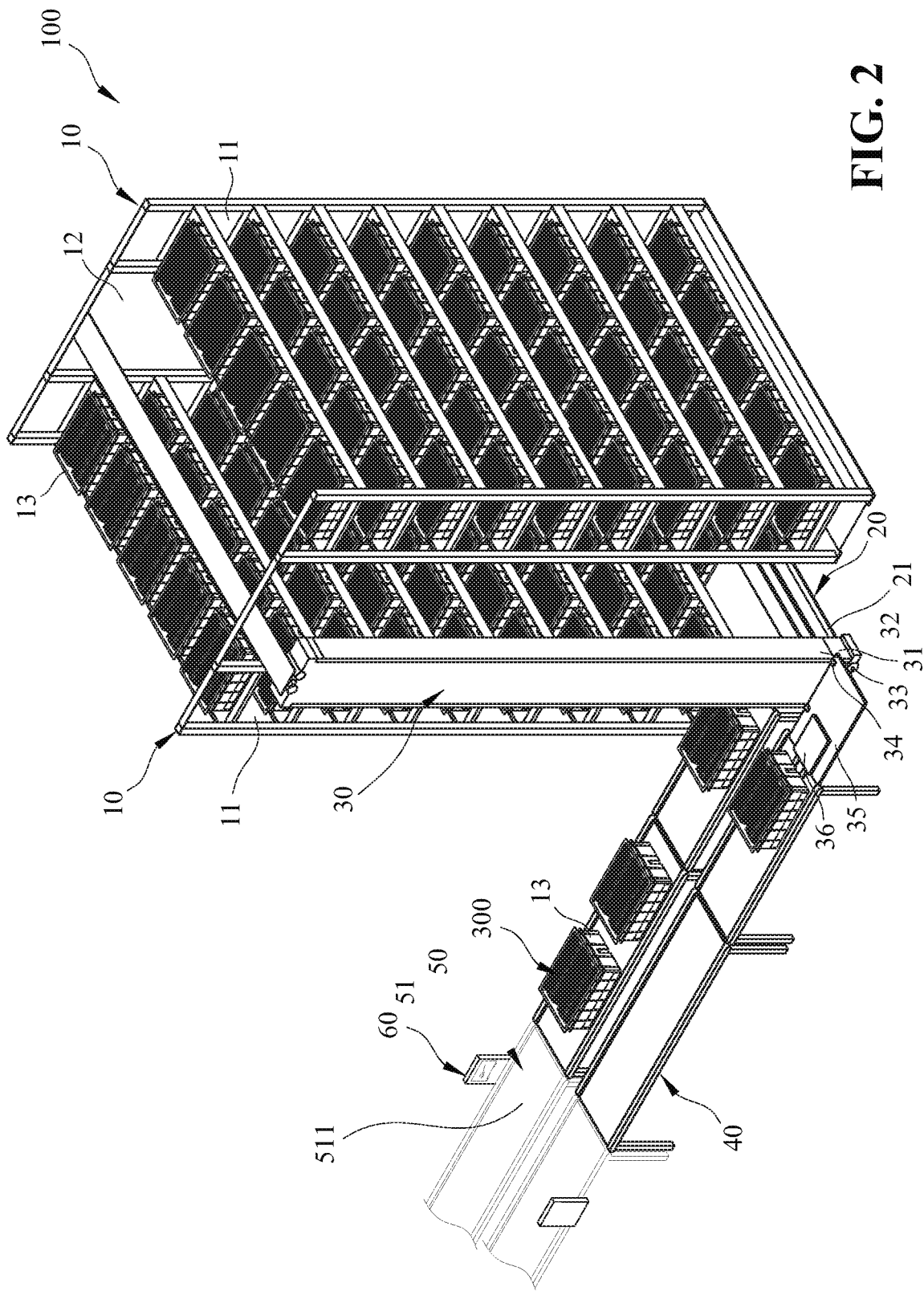
FIG. 2 is a schematic view of a system architecture of a preferred embodiment of the present invention.
Figure 3:
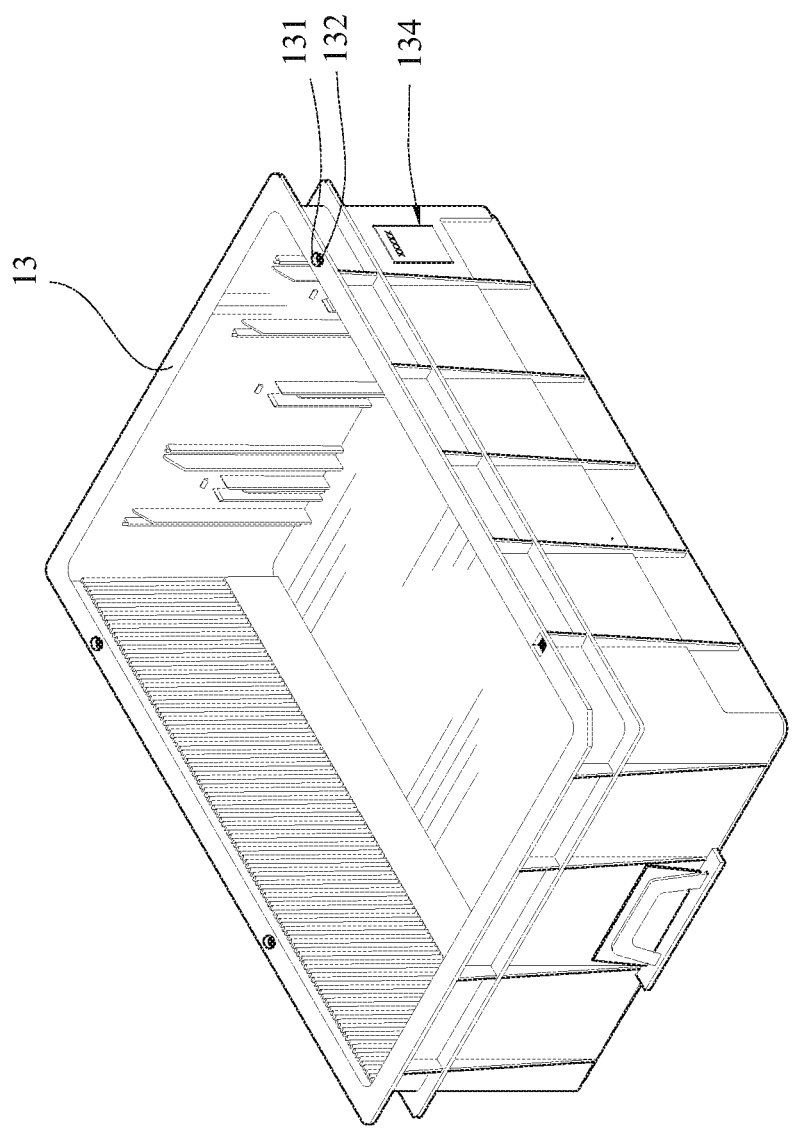
FIG. 3 is a perspective view showing a material crate in a preferred embodiment of the present invention.
Figure 4:
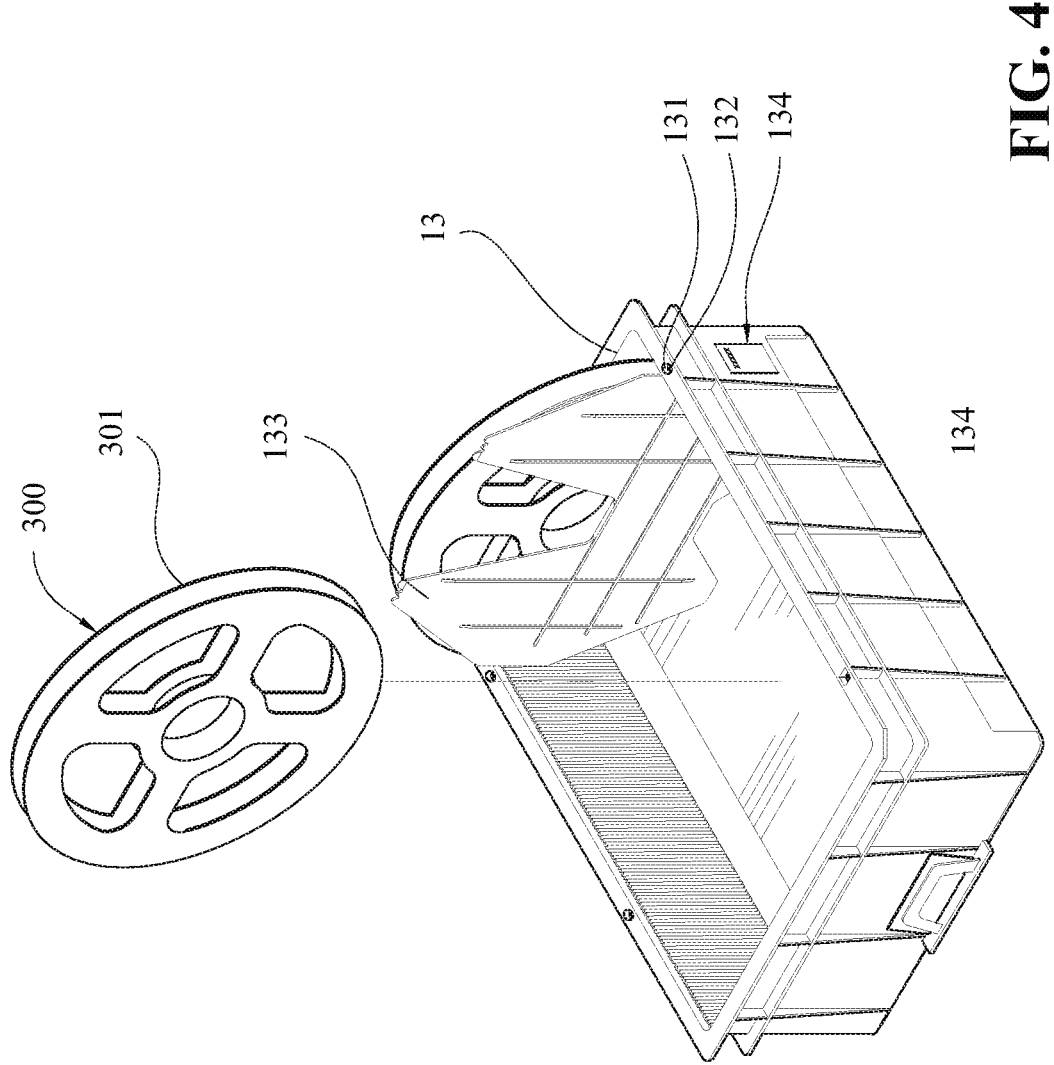
FIG. 4 is an exploded perspective view showing the material crate in a preferred embodiment of the present invention.
Figure 5:
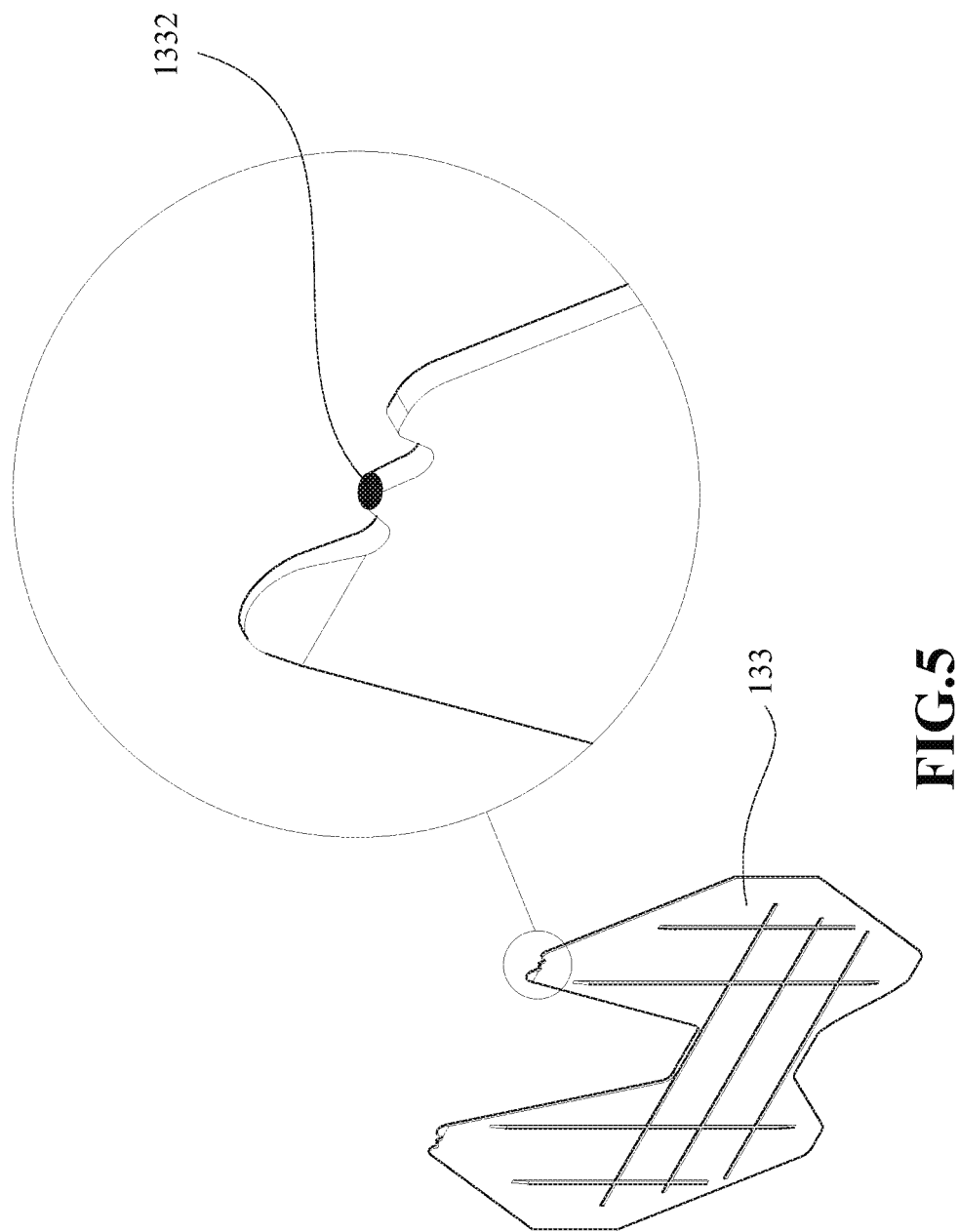
FIG. 5 is a perspective view showing a positioning plate in a preferred embodiment of the present invention.
Figure 6:
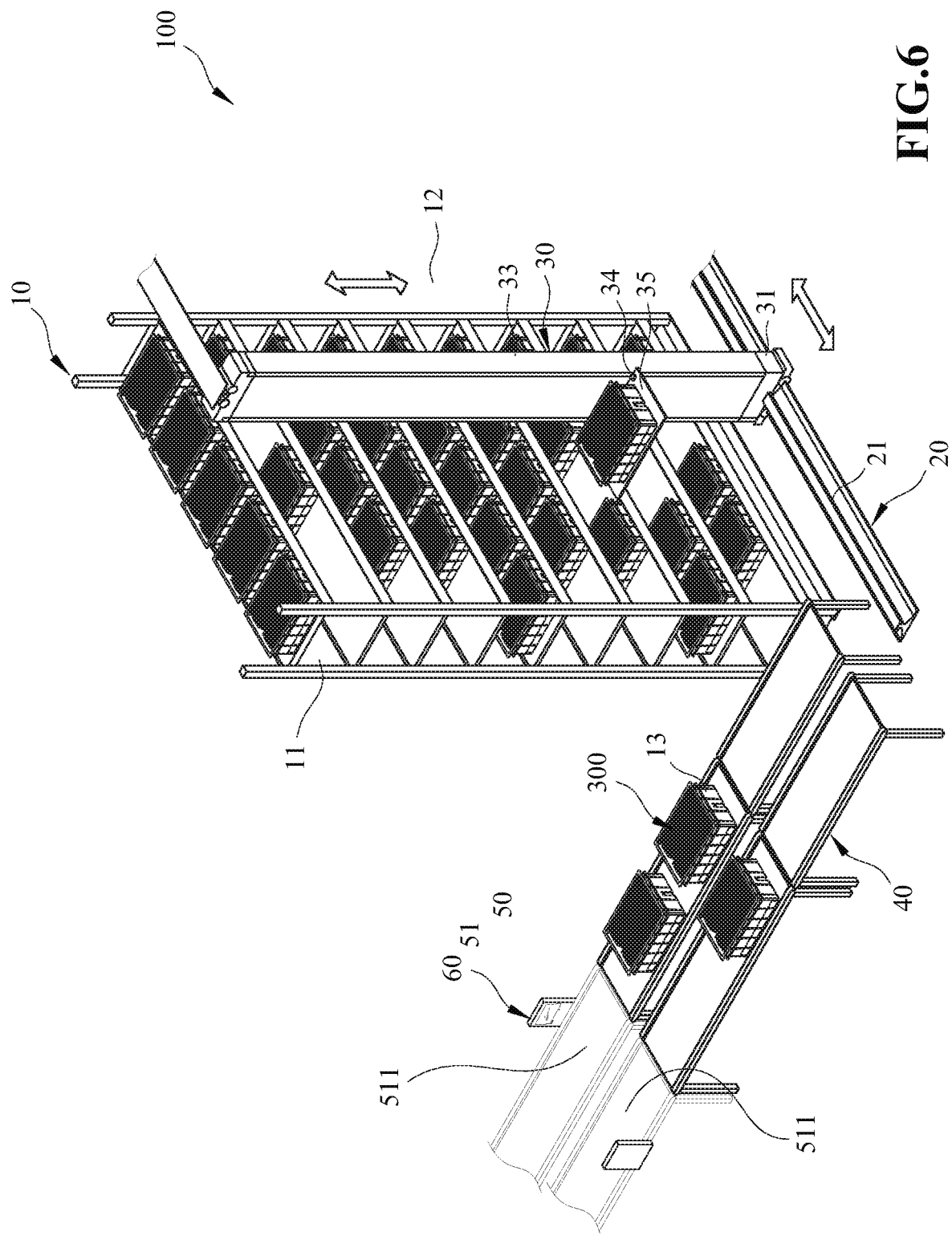
FIG. 6 is a schematic view showing the state of use of a preferred embodiment of the present invention.
Figure 7:
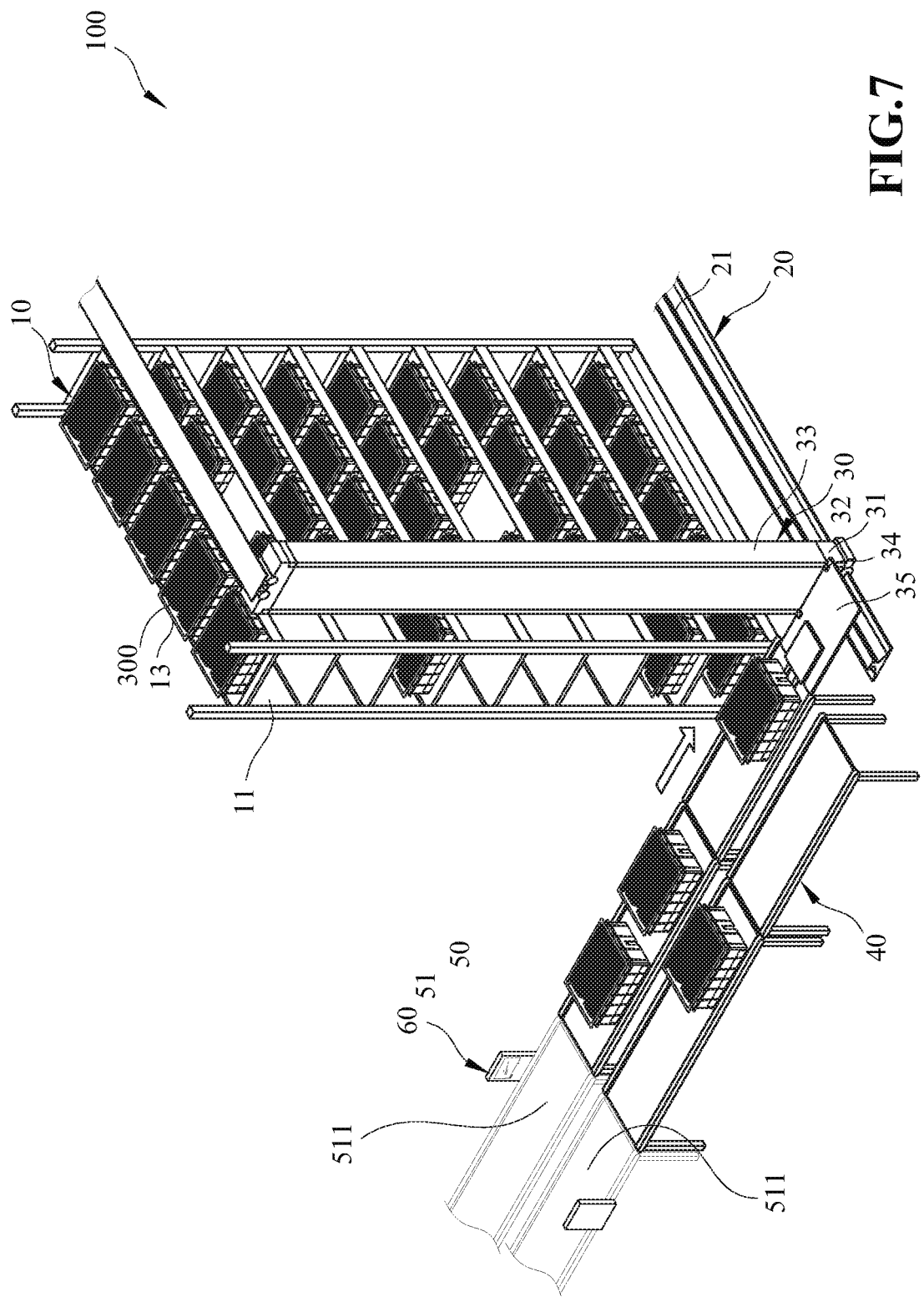
FIG. 7 is a schematic view showing the state of use of a preferred embodiment of the present invention.
Figure 8:
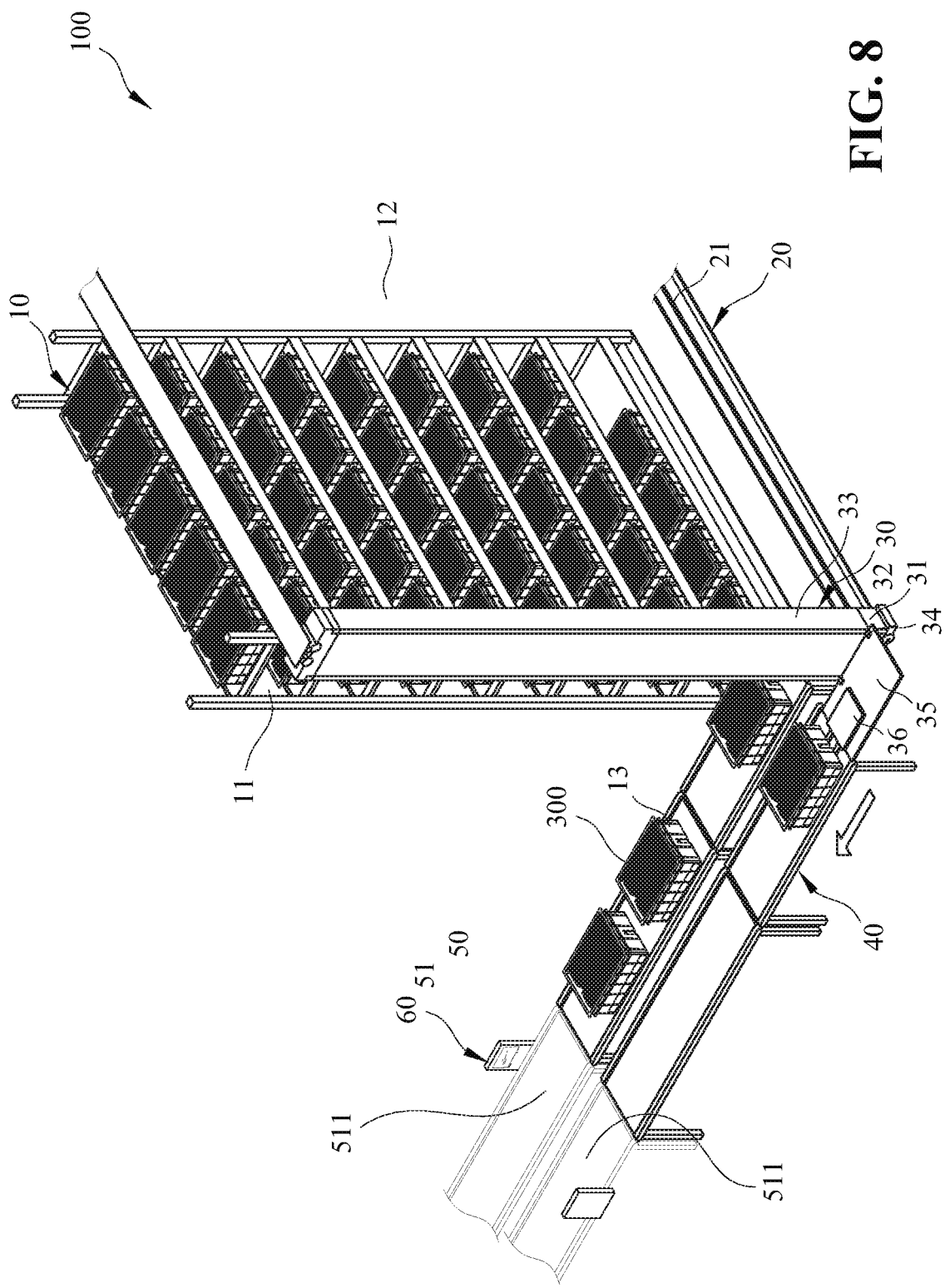
FIG. 8 is a schematic view showing the state of use of a preferred embodiment of the present invention.
Figure 9:
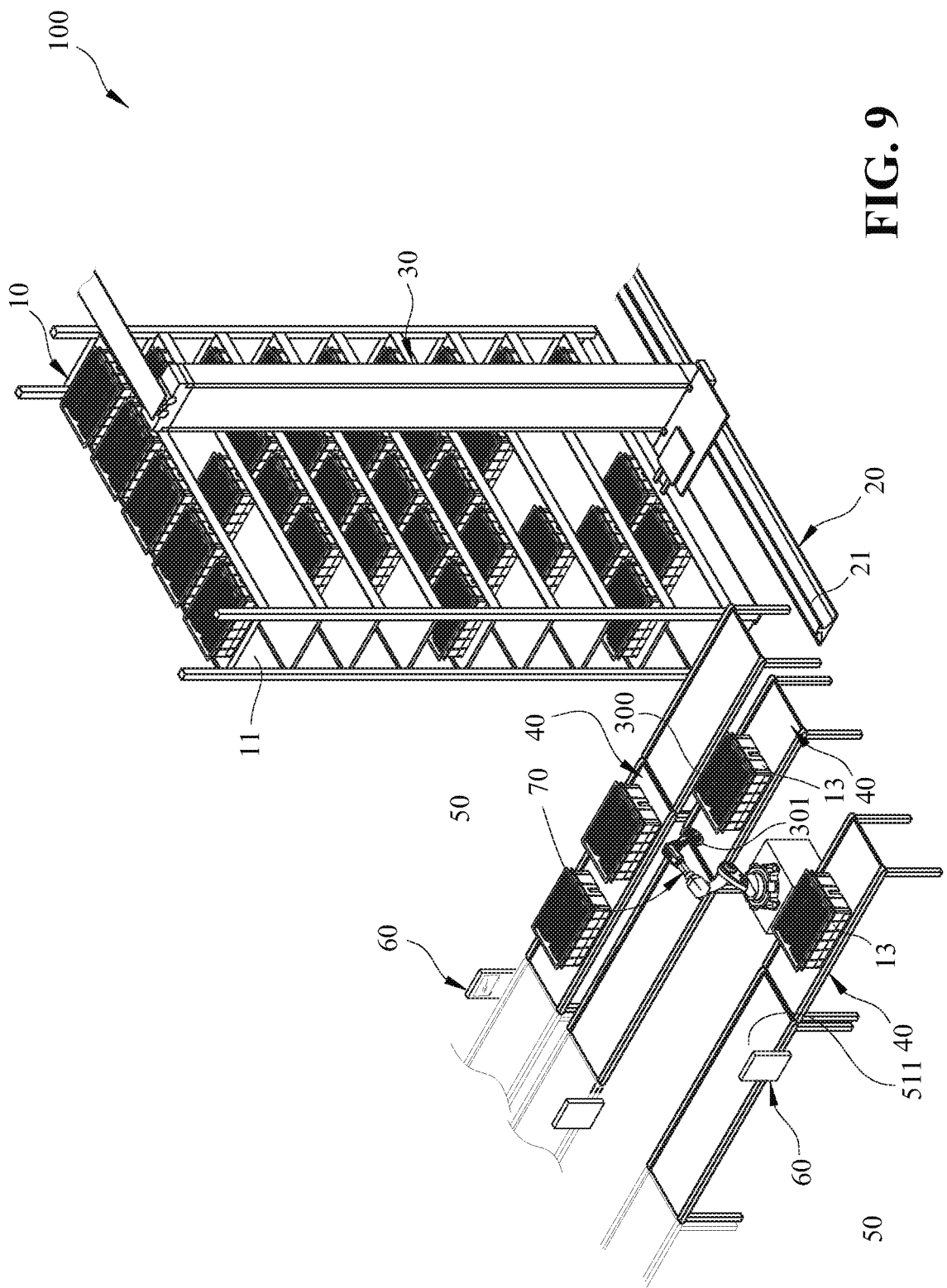
FIG. 9 is a schematic view showing the state of use of a preferred embodiment of the present invention.

Referring to FIG. 1 and FIG. 2, as well as FIG. 3, FIG. 4 and FIG. 5, for the system block diagram, system architecture, perspective and exploded perspective views of a material crate 13 and perspective view of positioning plate 133 of a preferred embodiment of the present invention, disclosing a storage and transportation system 100 for automated warehouse, which comprises:

A plurality of three-dimensional storage cabinets 10, arranged at intervals, and having a plurality of layers of accommodation spaces 11, with the plurality of material crates 13 disposed in the plurality of accommodation spaces 11, and at least a moving space 12 between two three-dimensional storage cabinets 10.

A plurality of guiding rail assemblies 20, disposed on a ground of the moving space 12, and adjacent to a circumferential side of the three-dimensional storage cabinet 10, the guiding rail assemblies 20 being interconnected; in the present embodiment, the plurality of guiding rail assemblies 20 comprises a plurality of guiding rails 21.

At least a vertical lifting and material-accessing device 30, movably in a sliding manner disposed on the guiding rail assemblies 20; in the present embodiment, the vertical lifting and material-accessing device 30 comprises a sliding base 31, a power assembly 32, at least a pole 33, a moving assembly 34, a carrying platform 35 and a material-moving assembly 36. The sliding base 31 is slidably disposed on the at least a guide rail assemblies 20, and the top of the sliding base 31 is provided with the pole 33. The moving assembly 34 is disposed at the outer side of the pole 33. The moving assembly 34 is connected to the carrying platform 35, and the carrying platform 35 is disposed with the material-moving assembly 36. The carrying platform 35 moves vertically up and down with respect to the pole 33 by the moving assembly 34. The power assembly is disposed at the sliding base 31 and is coupled to the moving component 34 and the material-moving assembly 36.

A plurality of automatic conveying modules 40, disposed adjacent to a side of the three-dimensional storage cabinets 10 and maintaining a distance from the three-dimensional storage cabinets 10, the automatic conveying module 40 being configured to transport at least a material crate 13, whose outer side being provided with at least a sensing tag 134 and at least a sensing and positioning structure 131; in the present embodiment, the plurality of automatic conveying modules 40 are selected from one of an automatic conveyor belt structure and an automatic roller conveying structure, or a combination thereof. Also, the plurality of automatic conveying modules 40 of the present invention are respectively an automatic conveyor belt structure and an automatic roller conveyor structure.

At least an automatic positioning module 50, disposed on the automatic conveying module 40, and having at least two mechanical positioning members 51 and a sensing processing unit 52, the sensing processing unit 52 being coupled to the mechanical positioning members 51, and when the automatic positioning module 50 being used during the automatic conveying module 40 transporting the material crate 13, the mechanical positioning members 51 temporarily position the material crate 13 on the automatic conveying module 40, and the sensing processing unit 52 transmitting at least a fixed-point signal; in the present embodiment, an optical positioning space 511 is disposed between the plurality of mechanical positioning members 51, and the plurality of mechanical positioning members 51 are configured to provide the material crate 13 to position the optical positioning space 511 when the automatic conveying module 40 transports the material crate 13. The sensing processing unit 52 transmits at least a fixed-point signal.

At least a reading module 60, having a plurality of optical readers 61 and a plurality of information readers 62, and disposed at locations selected from at least one of the group consisting of the three-dimensional storage cabinets 10, the vertical lifting and material-accessing device 30, the guiding rail assemblies 20 and the automatic conveying modules 40, and at least one optical reader 61 and at least one information reader 62 being respectively disposed adjacent to the automatic positioning module 50, and being configured to optically read the positioning of the sensing and positioning structure 131 on the material crate 13 and scan to read the information on the sensing tag 134 of the material crate 13, and transmitting at least an optical positioning signal and at least a material information.

At least an automatic gripping module 70, located on one side of at least an automatic conveying module 40, and two automatic conveying modules 40 being disposed respectively on two sides of the automatic gripping module 70; in the present embodiment, the automatic gripping module 70 is an automatic robot arm. The central control processing module 80 can be selected according to one or a combination of the optical positioning signal, the material information, and the read feedback information, to control the action of the automatic gripping module 70. The at least an optical reader 61 is disposed in the automatic gripping module 70, and the information reader 62 is disposed in the automatic conveying module 40.

A central control processing module 80, coupled to the vertical lifting and material-accessing device 30, the plurality of automatic conveying modules 40, the automatic gripping module 70, the reading module 60 and the automatic positioning module 50, for receiving and processing the fixed-point signal, the optical positioning signal and the material information, and then controlling the vertical lifting and material-accessing device 30, the plurality of automatic conveying modules 40, the automatic gripping module 70, the reading module 60 and the automatic positioning module 50 to act.

Refer to FIG. 3, FIG. 4 and FIG. 5. In the present embodiment, the sensing tags 134 are selected from one or a combination of a radio frequency (RF) tag and a barcode tag. The information reader 62 reads the sensing tag 134 and generates at least a material information. Furthermore, the outer side of the material crate 13 is respectively provided with a plurality of sensing and positioning structures 131 selected from one or a combination of the studs and the grooves, and the studs and the grooves are disposed with a first identification reflective portion 132 respectively. The optical reader 61 optically reads the first identification reflective portions 132 to obtain at least one optical positioning signal; moreover, as shown in FIG. 4 and FIG. 5, the inside of the material crate 13 is disposed with a plurality of positioning plates 133 spaced apart, and at least an object 300 is disposed between the positioning plates 133. The object 300 is exemplified by the material tray 301. The top edges of the positioning plates 133 are respectively provided with at least a second identification reflective portion 1332 and the optical reader 61 optically reads the first identification reflective portion 132 and the second identification reflective portions 1332 to obtain the at least an optical positioning signal; and the first identification reflective portion 132 and the second identification reflective portions 1332 are exemplified by a white coating layer.

Figure 10:
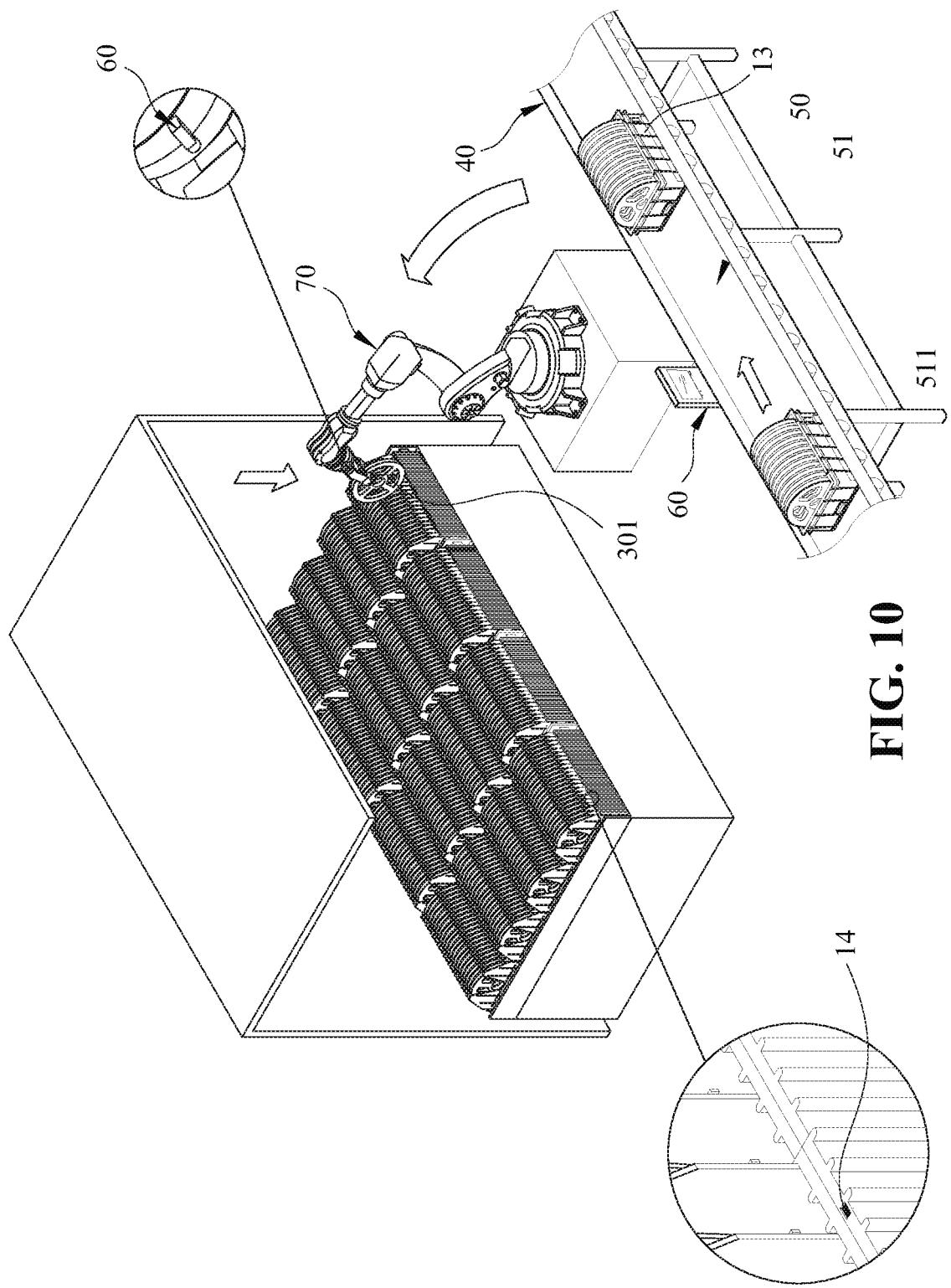
FIG. 10 is a schematic view showing the state of use of a preferred embodiment of the present invention.

It is worth noting that the three-dimensional storage cabinet 10 can be provided with a plurality of identification positioning points 14, as shown in FIG. 10, for the optical reader 61 to optically scan the identification positioning point 14, so as to clearly position the locations for gripping or storing for the external gripping device 70 (i.e., the automatic robot arm) to grip or deposit the material tray 301.

Figure 11:
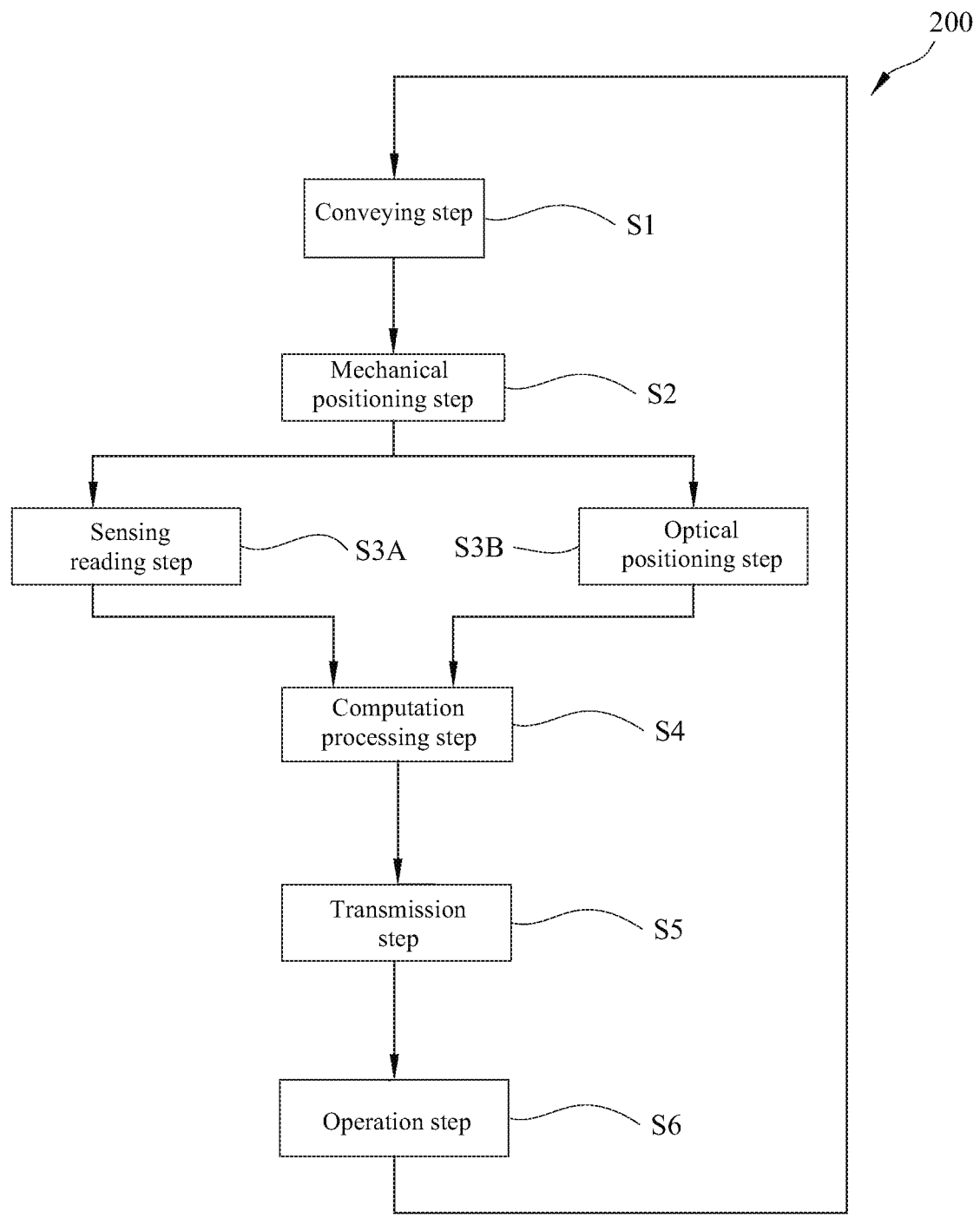
FIG. 11 is a schematic view showing the flowchart of a method of a preferred embodiment of the present invention.

Refer to FIG. 11, the present invention further provides a positioning control method 200 for automatic storage and transportation system based on the above-described storage and transportation system 100 for automated warehouse, the method comprising:

S1: a conveying step, the plurality of automatic conveying modules 40 conveying a plurality of material crates 13.

S2: a mechanical positioning step, in conveying the material crates 13, the sensing processing unit 52 causing one of the mechanical positioning members 51 to push one side of the material crate 13 in an elastic or retractable manner, and another mechanical positioning member 51 to push the other side of the material crate 13 in an elastic or retractable manner so that the material crate 13 being located in an optical positioning space 511, and then the sensing processing unit 52 transmitting at least a fixed-point signal.

S3A: a sensing reading step, the plurality of information readers 62 reading the sensing tag 134 and generating at least one material information, and the sensing processing unit 52 transmitting the material information to the central control processing module 80.

S3B: an optical positioning step, the plurality of optical readers 61 reading the first identification reflective portion 131 and the second identification reflective portion 132 to obtain at least one optical positioning signal, and the sensing processing unit 52 transmitting the optical positioning signal to the central control processing module 80.

S4: a computation processing step, the central control processing module 80 receiving and processing the fixed-point signal, the optical positioning signal and the material information to obtain a plurality of material-retrieving information and a plurality of feeding information, and converting the plurality of material-retrieving information and the plurality of feeding information into a plurality of execution process information.

S5: a transmission step, the central control processing module 80 transmitting the execution process information to the vertical lifting and material-accessing device 30, the plurality of automatic conveying modules 40, and the automatic gripping module 70 and the reading module 60 to control the vertical lifting and material-accessing device 30, the plurality of automatic conveying modules 40, the automatic gripping module 70 and the reading module 60 to act.

S6: an operation step, the vertical lifting and material-accessing device 30, the plurality of automatic conveying modules 40, and the automatic gripping module performing at least a material-retrieving operation and at least a material-depositing operation according to the execution process information.

Figure 12:
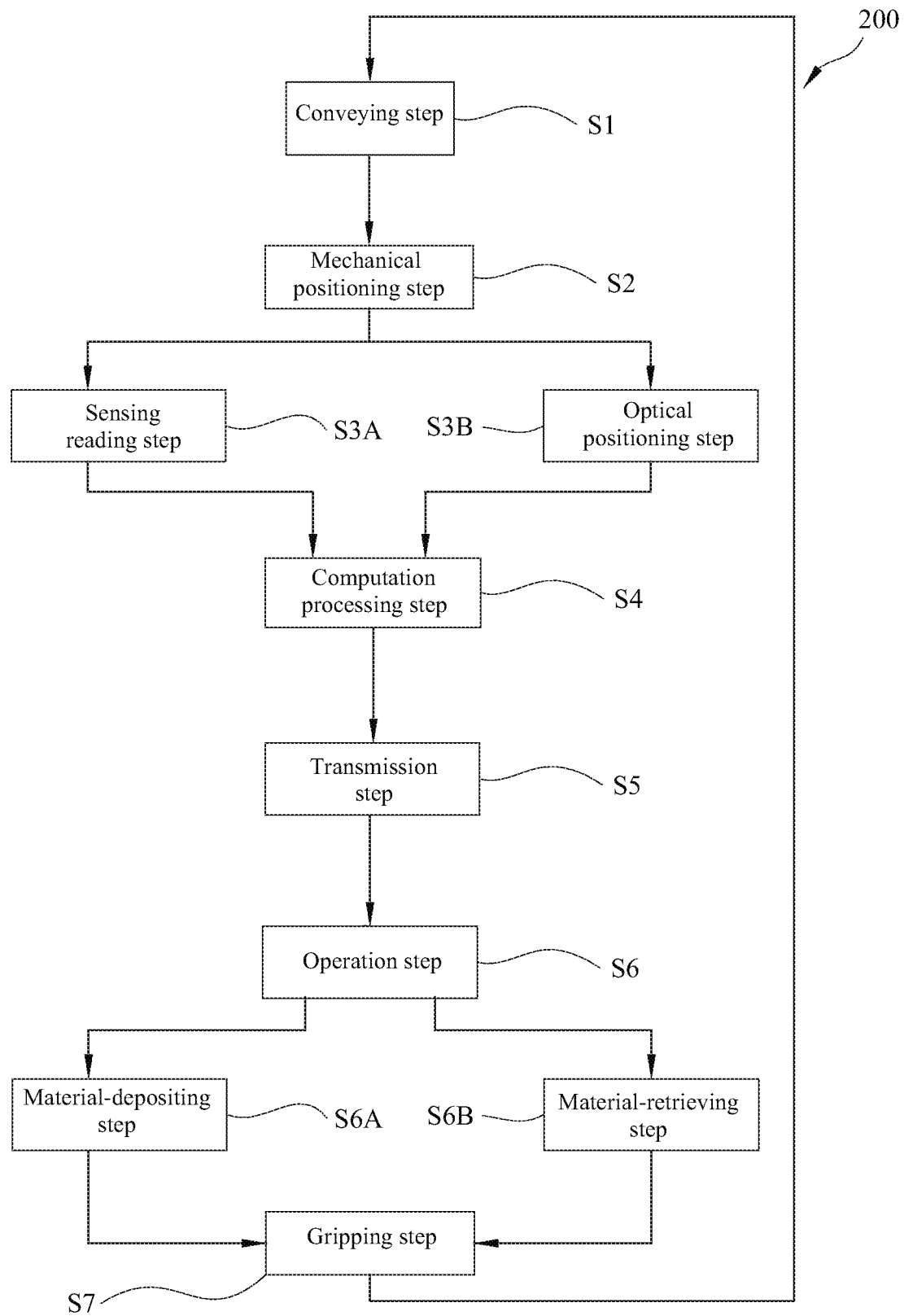
FIG. 12 is a schematic view showing the flowchart of a method of a preferred embodiment of the present invention.

Also refer to FIG. 12 for the flowchart of the method of another preferred embodiment of the present invention, wherein the positioning control method 200 further comprises a material-depositing step S6A, a material-retrieving step S6B, and a gripping step S7, and wherein:

S6A: the material-depositing step, in the operation step S6, the vertical lifting and material-accessing device 30 determines the position of the material crate in a shortest path of depositing the material crate 13 in the three-dimensional storage cabinet 10 according to the execution process information. Thereafter, the vertical lifting and material-accessing device 30 extends the material-moving assembly 36 and places the material crate 13 on the carrying platform 35, and then deposits the material crate 13 in the three-dimensional storage cabinet 10, and then the vertical lifting and material-accessing device 30 resets to the original position or re-executes another execution process information.

S6B: the material-retrieving step, in the operation step S6, the vertical lifting and material-accessing device 30 determines the position of the material crate in a shortest path of depositing the material crate 13 in the three-dimensional storage cabinet 10 according to the execution process information. Thereafter, the vertical lifting and material-accessing device 30 extends the material-moving assembly 36 and places the material crate 13 on the carrying platform 35, and then delivers the material crate 13 to a transportation place of the automatic conveying modules 40, and the automatic conveying module 40 conveys the material crate 13.

S7: the gripping step, after the material-depositing step S6A and/or the material-retrieving step S6B, the automatic gripping module 70 grips at least an object 300 in the material crate 13 on the automatic conveying module 40 according to the execution process information, and then the gripped at least an object 300 is placed in another material crate 13 located in another automatic conveying module 40.

To further understand the characteristics of the invention, the use of technical means and the expected results, the invention is described in details as follows:

Referring to FIG. 11 and FIG. 12, as well as FIG. 2 and FIGS. 6-10, for the flowchart of the method and schematic views of state of use of a preferred embodiment of the present invention. In the state of use, the present invention uses the automatic positioning module 50 to position the material crate 13 in the optical positioning space 511 in a mechanical positioning manner, and the sensing tag 134 and the sensing and positioning structure 131 of the material crate 13 are disposed to allow the reading module to position the material crate 13 in an optical reading manner and to scan to read the information of the material crate 13. More specifically, the present invention is capable of performing optical positioning and mechanical positioning during the process of accessing the material. In collaboration with the use of the vertical lifting and material-accessing device 30, the plurality of automatic conveying modules 40, the automatic gripping module 70, the reading module 60, the automatic positioning module 50 and the central control processing module 80, as well as the use of the aforementioned positioning control method 200, the present invention can thereby realize reading material crate information in the transportation process, and at the same time realize the interference-free access flow in a multi-station process, so as to achieve high precision in the synchronous monitoring and automatic access function of the material trays 301 of the material crate 13 in the existing automatic storage, as well as high access efficiency and accurate identification.

Moreover, the conveying step S1, the mechanical positioning step S2, the sensing reading step S3A, the optical positioning step S3B, the computation processing step S4, the transmission step S5, the operation step S6, the material-depositing step S6A, the material-retrieving step S6B, and the gripping step S7 can set the execution process in sequence according to the application, as shown in FIG. 11 and FIG. 12.

It should be noted that, from the above description of the system architecture and the positioning control method 200, it is clear that the present invention is to systematically pick and/or store materials, and can accurately and efficiently perform the identification and detection of the location/state of the material tray 301 and the material crate 13; at the same time, each of the three-dimensional storage cabinets 10 is a separate unit, which achieves good scalability. More importantly, the present invention achieves the ability to provide a storage location for dispensing materials and picking materials for on-site operations of an automated warehouse system and to achieve a detailed classification to provide optimum configuration of material flow.

Hereby, the characteristics of the present invention and achievable expected effects thereof are stated as follows:

The storage and transportation system 100 for automated warehouse and positioning control method 200 thereof of the present invention use the automatic positioning module 50 to position the material crate 13 in the optical positioning space 511 in a mechanical positioning manner, and the sensing tag 134 and the sensing and positioning structure 131 of the material crate 13 are disposed to allow the reading module to position the material crate 13 in an optical reading manner and to scan to read the information of the material crate 13. In collaboration with the use of the vertical lifting and material-accessing device 30, the plurality of automatic conveying modules 40, the automatic gripping module 70, the reading module 60, the automatic positioning module 50 and the central control processing module 80, as well as the use of the aforementioned positioning control method 200, the present invention can achieve a detailed classification to provide optimum configuration of material flow.

As such, the present invention has the following implementation effects and technical effects:

Firstly, the present invention can perform optical positioning and mechanical positioning during the operation process of the access material, so that the information of the material crate 13 can be read in the conveying process, and at the same time, an interference-free multi-stations access process can be realized, as well as to realize synchronous monitoring and automatic access of the material trays 301 in the material crate 13 of system in a high-precision manner, and having high access efficiency and accurate identification.

Secondly, the present invention, through systematically picking and/or storing materials in collaboration with reading mechanism of optical positioning and mechanical positioning, can accurately and efficiently perform the identification and detection of the location/state of the material tray 301 and the material crate 13; at the same time, the present invention can replace the manual replacement of the tray, reduce the frequency of manual operations and reduce the labor cost of production.

Thirdly, the invention can provide a storage location for dispensing materials and picking materials for on-site operations of an automated warehouse system and strictly control the material usage rate and the life cycle of the material, and through optical positioning and mechanical positioning, the present invention can achieve reading the information of the material crate 13 during the transportation process and achieve a detailed classification to provide optimum configuration of material flow.

Fourth, each of the three-dimensional storage cabinets 10 is a separate unit, which achieves good scalability. In addition, by using the guiding rail assemblies 20, the space mechanism is utilized and is easy to implement a system wherein the material crates are simultaneously fed into and taken out of a plurality of three-dimensional storage cabinets 10.

In summary, the present invention shows excellent progress and practicality among similar products. At the same time, the technical information about such structures has been checked and the same structure has not been found in the literature. Therefore, the present invention meets the patent requirements, and an application is filed accordingly.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A storage and transportation system for automated warehouse, comprising:
    a plurality of three-dimensional storage cabinets arranged at intervals, and having a plurality of layers of accommodation spaces, with a plurality of material crates disposed in the plurality of accommodation spaces, and at least a moving space between two three-dimensional storage cabinets;
    a plurality of guiding rail assemblies, disposed on a ground of the moving space, and adjacent to a side of the three-dimensional storage cabinet, the guiding rail assemblies being interconnected;
    at least a vertical lifting and material-accessing device, movably in a sliding manner disposed on the guiding rail assemblies;
    a plurality of automatic conveying modules, disposed adjacent to a side of the three-dimensional storage cabinets and maintaining a distance from the three-dimensional storage cabinets, the automatic conveying module being configured to transport at least a material crate, whose outer side being provided with at least a sensing tag and at least a sensing and positioning structure;
    at least an automatic positioning module, disposed on the automatic conveying module, having at least two mechanical positioning members coupled to a sensing processing unit, wherein when the material crate being transported to a place by the automatic conveying module, the sensing processing unit causing one of the mechanical positioning members to push on side of the material crate, and another mechanical positioning member to push the other side of the material crate, so as to temporarily position the material crate being located in an optical positioning space of the automatic conveying module, and then the sensing processing unit transmitting at least a fixed-point signal;
    at least a reading module, having a plurality of optical readers and a plurality of information readers, and disposed at locations selected from at least one of the group consisting of the three-dimensional storage cabinets, the vertical lifting and material-accessing device, the guiding rail assemblies and the automatic conveying modules, and at least one optical reader and at least one information reader being respectively disposed adjacent to the automatic positioning module, wherein the optical readers are configured to optically read the positioning of the material crate and transmitting at least an optical positioning signal, and the information readers scan to read the information of the material crate and transmitting at least a material information;
    at least an automatic gripping module, located on one side of at least one of the plurality of automatic conveying modules, or two of the automatic conveying modules being disposed respectively on two sides of the automatic gripping module; and
    a central control processing module, coupled to the vertical lifting and material-accessing device, the plurality of automatic conveying modules, the automatic gripping module, the reading module and the automatic positioning module, for receiving and processing the fixed-point signal, the optical positioning signal and the material information, and then controlling the vertical lifting and material-accessing device, the plurality of automatic conveying modules, the automatic gripping module, the reading module and the automatic positioning module to act.

2. The storage and transportation system according to claim 1, wherein the sensing tags are selected from one or a combination of a radio frequency (RF) tag and a barcode tag; the plurality of information readers read the sensing tags and generate at least a material information; a plurality of sensing and positioning structures are disposed on outside the outer sides of the material crates, and the sensing and positioning structures are disposed in a form of one or a combination selected from a group consisting of a stud and a groove; a first identification reflective portion is respectively disposed on the plurality of studs and grooves, and the plurality of optical readers optically read the plurality of first identification reflective portions to obtain at least an optical positioning signal.

3. The storage and transportation system according to claim 2, wherein a plurality of positioning plates are disposed in the material crates, and at least an object is disposed between the plurality of positioning plates; top edges of the plurality of positioning plates are respectively provided with at least a second identification reflective portion, and the optical reader performs optical reading on the first identification reflective portions and the second identification reflective portions to obtain at least an optical positioning signal.

4. The storage and transportation system according to claim 3, wherein the automatic gripping module is an automatic robot arm; the central control processing module can, according to one or a combination of the optical positioning signal, the material information, and the read feedback information, control the action of the automatic gripping module; the at least an optical reader is disposed in the automatic gripping module, and the information reader is disposed in the automatic conveying module.

5. The storage and transportation system according to claim 1, wherein an optical positioning space id provided among the plurality of mechanical positioning members, and the plurality of mechanical positioning members are for providing the material crates positioning the optical positioning space during the automatic conveying modules conveying the material crates, and the sensing processing unit transmits at least a fixed-point signal.

6. The storage and transportation system according to claim 1, wherein the vertical lifting and material-accessing device comprises a sliding base, a power assembly, at least a pole, a moving assembly, a carrying platform and a material-moving assembly; the sliding base is slidably disposed on the at least a guide rail assemblies, top of the sliding base is provided with the pole, the moving assembly is disposed at outer side of the pole the moving assembly is connected to the carrying platform, the carrying platform is disposed with the material-moving assembly; the carrying platform moves vertically up and down with respect to the pole by the moving assembly; the power assembly is disposed at the sliding base and is coupled to the moving component and the material-moving assembly.

7. A positioning control method for a storage and transportation system for automated warehouse, applicable to the storage and transportation system for automated warehouse according to claim 1, comprising:
a conveying step: the plurality of automatic conveying modules conveying a plurality of material crates;
a mechanical positioning step: in conveying the material crates, the mechanical positioning members temporarily position the material crate on the automatic conveying module, and the sensing processing unit transmitting at least a fixed-point signal;
a sensing reading step: the plurality of information readers reading the sensing tag and generating at least one material information, and the sensing processing unit transmitting the material information to the central control processing module;
an optical positioning step: the plurality of optical readers reading the first identification reflective portion and the second identification reflective portion to obtain at least one optical positioning signal, and the sensing processing unit transmitting the optical positioning signal to the central control processing module;
a computation processing step: the central control processing module receiving and processing the fixed-point signal, the optical positioning signal and the material information to obtain a plurality of material-retrieving information and a plurality of feeding information, and converting the plurality of material-retrieving information and the plurality of feeding information into a plurality of execution process information;
a transmission step: the central control processing module transmitting the execution process information to the vertical lifting and material-accessing device, the plurality of automatic conveying modules, and the automatic gripping module and the reading module to control the vertical lifting and material-accessing device, the plurality of automatic conveying modules, the automatic gripping module and the reading module to act; and
an operation step: the vertical lifting and material-accessing device, the plurality of automatic conveying modules, and the automatic gripping module performing at least a material-retrieving operation and at least a material-depositing operation according to the execution process information.

8. The positioning control method according to claim 7, further comprising a material-depositing step: the vertical lifting and material-accessing device determining the position of the material crate in a shortest path of depositing the material crate in the three-dimensional storage cabinet according to the execution process information; thereafter, the vertical lifting and material-accessing device extending a material-moving assembly and placing the material crate on a carrying platform, and then depositing the material crate in the three-dimensional storage cabinet, and then the vertical lifting and material-accessing device resetting to original position or re-executing another execution process information.

9. The positioning control method according to claim 8, further comprising: a gripping step: the automatic gripping module gripping at least an object in the material crate on the automatic conveying module according to the execution process information, and then the gripped at least an object being placed in another material crate located in another automatic conveying module.

10. The positioning control method according to claim 7, further comprising a material-retrieving step: the vertical lifting and material-accessing device determining position of the material crate in shortest path of depositing the material crate in the three-dimensional storage cabinet according to the execution process information; thereafter, the vertical lifting and material-accessing device extending a material-moving assembly and placing the material crate on a carrying platform, and then delivering the material crate to a transportation place of the automatic conveying modules, and the automatic conveying module conveying the material crate.

* * * * *